United States Patent [19]
Banholzer

[11] Patent Number: 5,833,034
[45] Date of Patent: Nov. 10, 1998

[54] IMMOBILISING DEVICE ON A WHEELED VEHICLE

[75] Inventor: Philip Frederick Banholzer, Leanmington Spa, United Kingdom

[73] Assignee: Brian Taylor Limited, Warwick, United Kingdom

[21] Appl. No.: 525,632

[22] PCT Filed: Mar. 17, 1994

[86] PCT No.: PCT/GB94/00546

§ 371 Date: Nov. 30, 1995

§ 102(e) Date: Nov. 30, 1995

[87] PCT Pub. No.: WO94/21496

PCT Pub. Date: Sep. 29, 1994

[30] Foreign Application Priority Data

Mar. 25, 1993 [GB] United Kingdom .................. 9306266
Jul. 27, 1993 [GB] United Kingdom .................. 9315472

[51] Int. Cl.$^6$ .......................................... B06T 3/00
[52] U.S. Cl. ................... 188/32; 70/226; 410/30
[58] Field of Search ................... 188/32; 410/9, 410/19, 30; 70/14, 18, 225, 226

[56] References Cited

U.S. PATENT DOCUMENTS

| | | |
|---|---|---|
| 1,589,233 | 6/1926 | Schneider et al. . |
| 3,695,071 | 10/1972 | West .......................................... 74/225 |
| 4,977,974 | 12/1990 | Brown ....................................... 70/226 |

FOREIGN PATENT DOCUMENTS 4201653  7/1992  Japan .

*Primary Examiner*—Robert J. Oberleitner
*Attorney, Agent, or Firm*—Clifford W. Browning; Woodard, Emardt, Naughton Moriarty & McNett

[57] ABSTRACT

An immobilizing device 12 is connected to a wheeled vehicle such as a trailer 12 or caravan 52 by a connection. The device 12 comprises a wheel clamp to be secured to or about a wheel 14,53 of the wheeled vehicle. The connection in one embodiment comprises a rod 38 which is slidable and rotatable in two bushes 40 on the chassis 42 of the vehicle 10, the rod 38 being transverse to the vehicle and being connected to a bar 34 which is pivotally connected to the wheel clamp. In another embodiment the connection comprises a rod 70 which is slidable forwards and backwards in relation to the vehicle in two bushes 72 on the vehicle chassis and is connected to the wheel clamp.

28 Claims, 4 Drawing Sheets

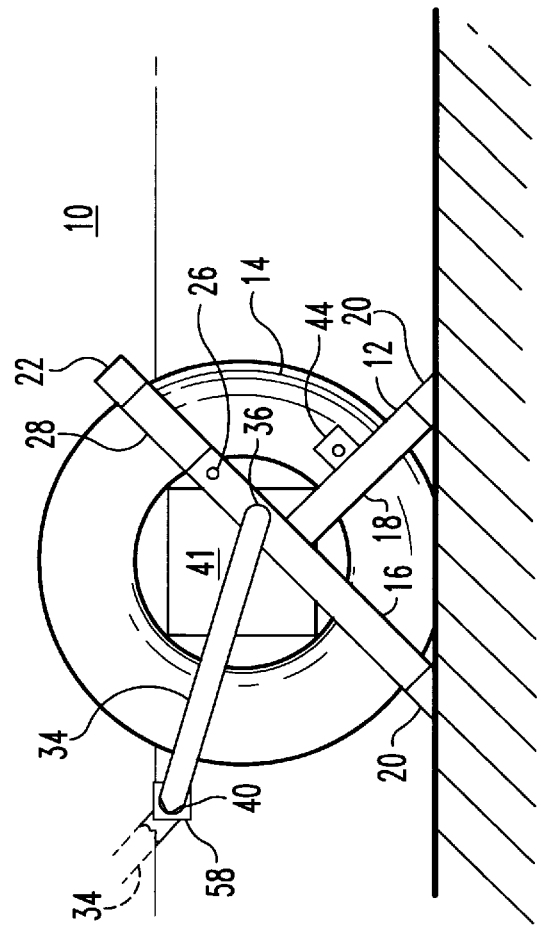
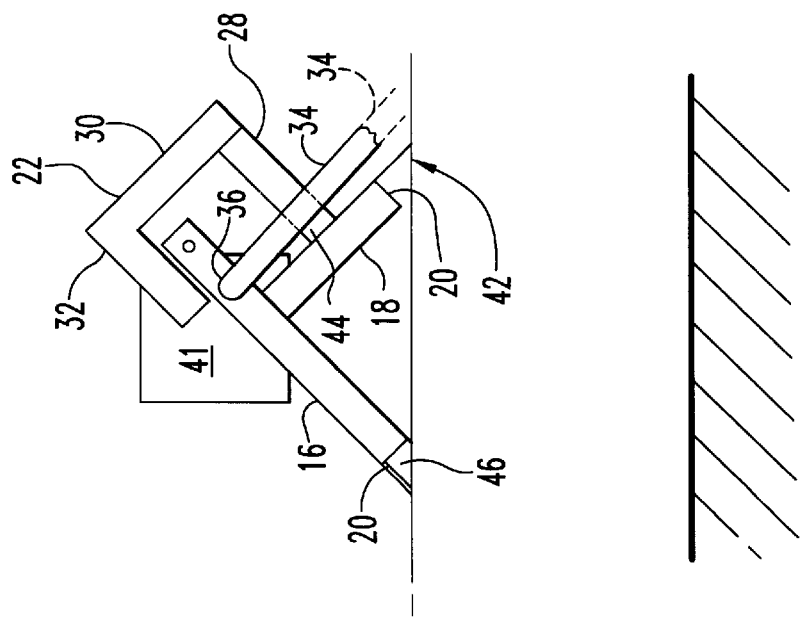
Fig. 1A
Fig. 1B

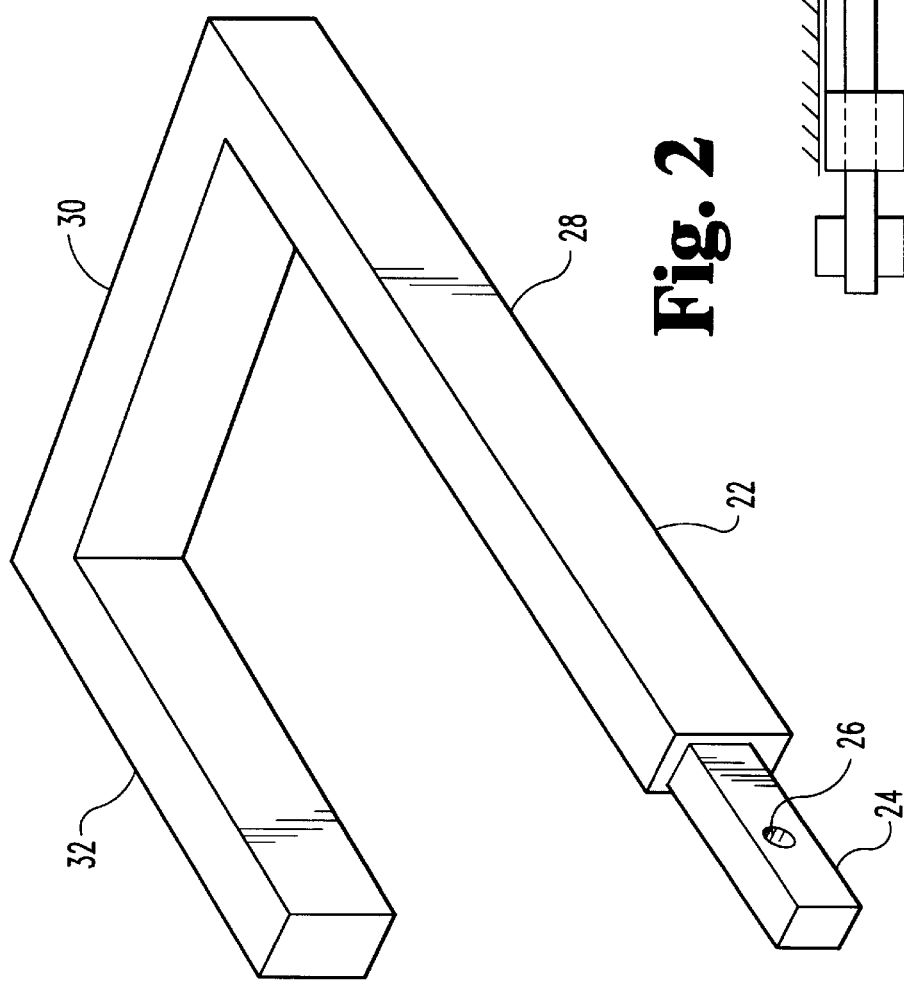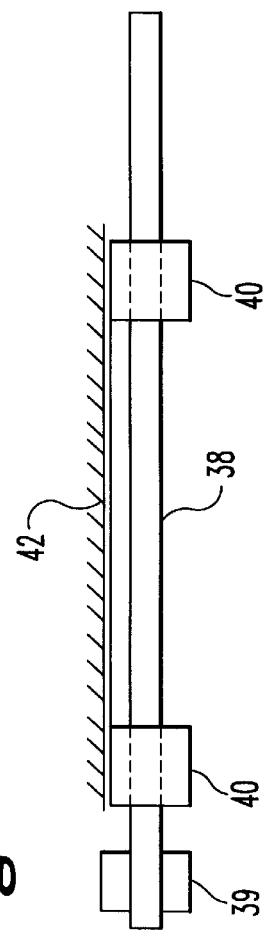

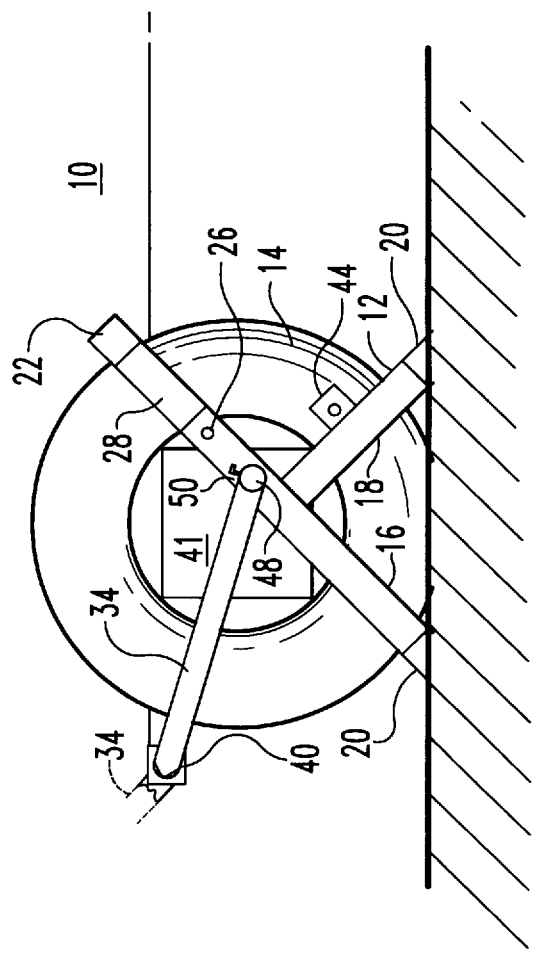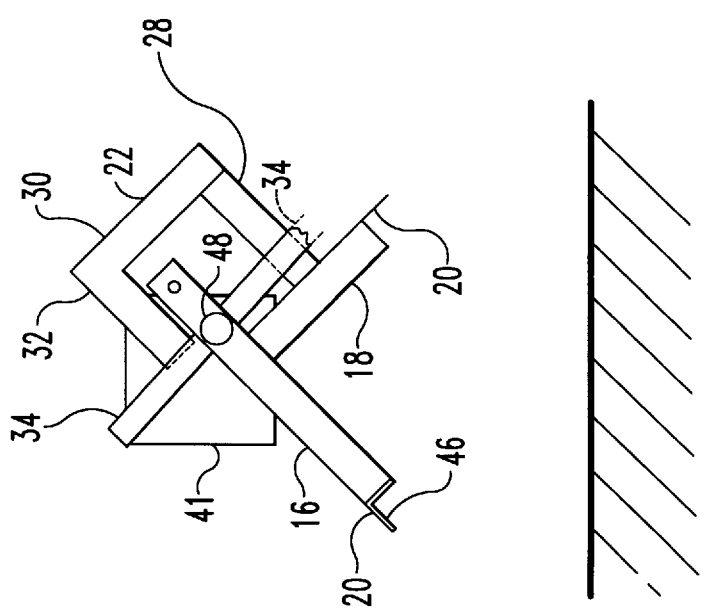
Fig. 4A
Fig. 4B

IMMOBILISING DEVICE ON A WHEELED VEHICLE

The invention relates to an immobilising device on a wheeled vehicle.

BACKGROUND OF THE INVENTION

Wheel clamps are known in various forms. These may be used by third parties to immobilise vehicles which are parked where they should not be or increasingly are being used by companies and private individuals to prevent theft of vehicles. Trailers and horse boxes are particularly prone to theft and may be locked with a wheel clamp. However, the user must remember to take the wheel clamp with him in order to be able to use it. Also, if the wheel clamp is not used, it may itself be stolen.

SUMMARY OF THE INVENTION

According to the invention there is provided an immobilising device on a wheeled vehicle, the immobilising device being connected to the vehicle by a connection and being arranged to be secured to or about a wheel to prevent rotation or complete rotation of the wheel and thereby immobilise the vehicle.

If the immobilising device is connected to the vehicle, the user cannot forget to take it with him and the device cannot be stolen when not in use.

The immobilising device is preferably a wheel clamp.

The immobilising device is preferably retained outside the vehicle when not in use and may be covered by a cover or in a housing when not in use.

The connection may be connected to any suitable part of the vehicle and in a preferred embodiment is connected to a chassis of the vehicle. This provides a strong connection which is relatively difficult to access.

The connection preferably consists of at least one rigid element. In this way the connection can be stronger and resist cutting better. The connection may comprise two or three rigid elements which may be connected pivotally and/or slidably. This construction lends strength to the connection.

The connection may include a rod which is slidable in relation to the wheel. In this way, the device may be slid towards and away from the wheel for fitting and removal. The rod may be slidable in any suitable direction. In one embodiment the rod is slidable axially in a direction substantially parallel to the wheel axis. Thus the device can be slid inwardly and outwardly. In another embodiment the rod is slidable axially backwards and forwards in relation to the vehicle. In that case the device is preferably stored forwards of the wheel when not in use. In that way dirt, water and other water driven backwards by the wheel will not be driven onto the device. Which embodiment is chosen may depend upon the available space around the wheel. Preferably, the rod is slidable in at least one bush (alkla bushing) and there are preferably two bushes. Where the rod is slidable axially in a direction substantially parallel to the wheel axis the two bushes may be symmetrically spaced about the long axis of the vehicle.

The connection may permit movement of the device in the forwards or backwards direction of the vehicle. This movement may be permitted in any suitable manner and conveniently the connection permits rotation of the device. The rotation may be about an axis parallel to the wheel axis. In a preferred embodiment, the connection includes a rod which is rotatable about its own axis. The rod may be rotatable in at least one bush and preferably there are two bushes. The rod may be mounted to lie parallel to the wheel axis and in that case the two bushes may be symmetrically spaced about the long axis of the vehicle. The rod is preferably the same rod which is slidable axially. The or each part of the rod which contacts the or each bush may be round but preferably is of polygonal transverse cross-section, preferably of square transverse cross-section. This ensures that the rod does not jam or become difficult to move in the way that a round rod in a round bush might do, in particular where the connection is outside the vehicle and therefore liable to collect road debris.

The rod is preferably connected to the device by a bar transverse to the rod. The device may be mounted to be able to pivot in relation to the rod. Thus, the orientation of the device can be changed in relation to the rod which is helpful to permit the device to be arranged in a suitable orientation for storage away from the wheel. In that case the bar is preferably connected to the device through a pivot joint.

The device may include at least one removable section. This permits a degree of disassembly for storage. Preferably only one section is removable. In particular where the device is to be retained outside the vehicle this provides a good compromise between compactness and number of parts, as it is important that parts do not get lost and the device can be rapidly assembled. Preferably, the or each removable section is mountable elsewhere on the device. In particular where the device is retained outside the vehicle this feature is useful.

The device may comprise at least two arms which lie alongside the contact surface of the wheel in spaced positions.

Preferably then one of the said arms is removable. The removable arm may then be mountable on the other or another arm. The device can then be stored in a more compact form.

At least one arm of the device preferably includes a chock for the wheel.

The device and the rod may be connected through a slidable connection such that the device can be slid towards the rod. This again gives greater flexibility and positioning of the device for storage.

BRIEF DESCRIPTION OF THE DRAWING FIGURES

Three embodiments of the invention will now be described by way of example and with reference to the accompanying drawings, in which:

FIG. 1A is a side elevation of a device in a first embodiment according to the invention fitted to a wheel of a wheeled vehicle;

FIG. 1B is the same view but with the device in the stowed position on the vehicle;

FIG. 2 is a perspective view of a U-shaped part of the device of the first embodiment;

FIG. 3 is a detail elevation of part of the first embodiment;

FIGS. 4A and 4B are the same views as FIGS. 1A and 1B but of the second embodiment;

DETAILED DESCRIPTION OF THE PREFERRED EMBODIMENTS

Figure 5:
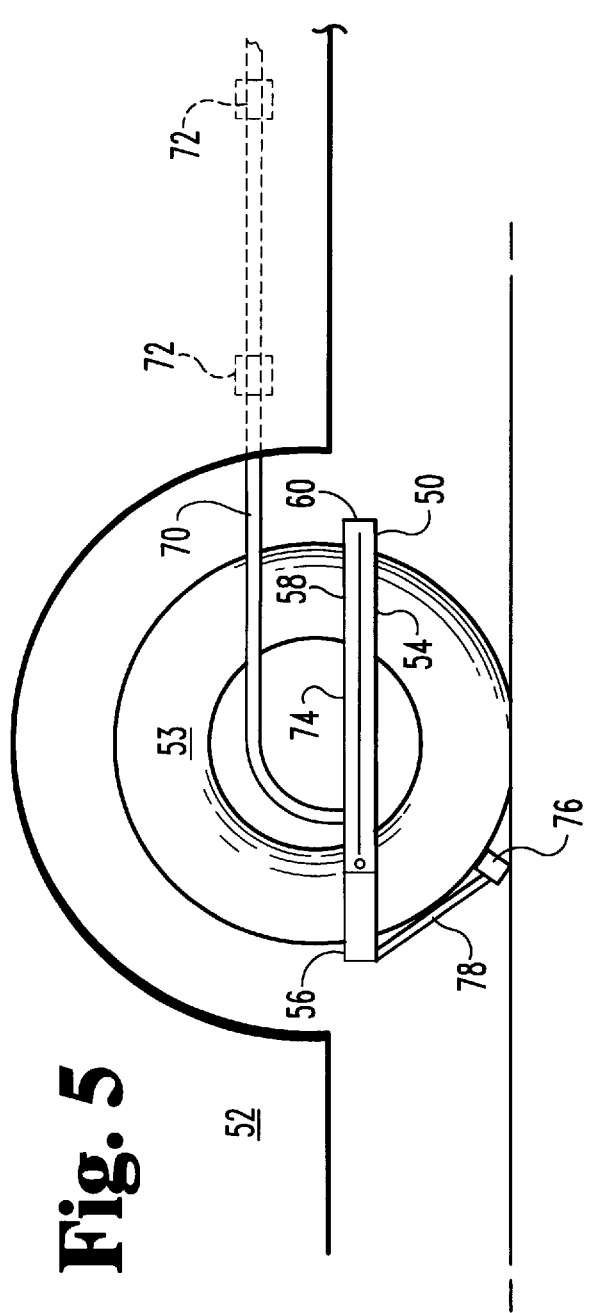
FIG. 5 is a side elevation of the device of the third embodiment on a vehicle; and, FIG. 6 is a plan view of the device of FIG. 5.

FIG. 1A shows a trailer 10 with a device 12 according to the invention attached to a wheel 14 of the trailer 10. The device 12 has two perpendicular legs 16,18 which extend across the outer face of the wheel and terminate in ground engaging pieces 20. The pieces 20 are of angle section and extend rearwardly to act as chocks for the wheel 14. The legs 16,18 are formed of rectangular tubular steel. Right-hand leg 18 is welded to left-hand leg 16. The left-hand leg 16 is continued past the perpendicular connection to the right-hand leg 18 and is connected to a U-shaped part 22. The outer end of the right-hand leg 18 forms a socket in which a reduced cross-section part of the U-shaped part is received. The connection is held by a padlock which passes through apertures 26 in the leg 18 and reduced cross-section part 24. The main part of the U-shaped part is of the same rectangular tubular steel as the legs 16,18. The U-shaped part 22 extends in the same direction as the leg 16 to the perimeter of the wheel 14 and then turns across the ground engaging surface of the wheel and returns towards the centre of the wheel 14 behind it. It thus comprises three sections 28,30,32 respectively.

A bar 34 is connected by pivot connection 36 to the left-hand leg 16 close to the centre of the wheel 14. The bar 34 is connected at its other end to a rod 38 which extends perpendicularly to the bar 34 and parallel to the axis of the wheel 14. The rod 38 is received in two spaced bushes 40 which are connected to the chassis 42 of the trailer 10. The bar 34 is round and the rod 38 is of square cross-section. Both are made of steel and may be made of hardened steel to resist cutting. The bushes 40 are spaced at equal distances from the opposite sides of the trailer 10. The bushes 40 have cylindrical journal surfaces to receive the square rod 38. The bushes are lubricated. The rod 38 includes a step 39 at its inner end to limit sliding travel.

A rectangular plate 41 is provided behind the legs 16,18 and secured to them. The plate 41 covers the wheel nuts of the wheel 14 when the device 12 is fitted to the wheel 14 to prevent access to the wheel nuts to remove the wheel 14.

Partway along the upper surface of the right-hand leg 18 is provided a short outwardly facing socket 44. An angle piece rest 46 is provided to the left of the bushes 40 on the side of the trailer 10 to support the device 12 in the stowed position. The rest 46 is to the rear of the wheel 14 and this arrangement is preferred although the rest or other support for the device could lie ahead of the wheel 14. To stow the device, the padlock is unlocked from the apertures 26 to release the U-shaped part 22. That is then pulled out of the left-hand leg 16, rotated through 90° and inserted in the socket 44 in the right-hand leg 18 where the inner arm 32 of the U-shaped part 22 lies just above the upper end of the left-hand leg 16. The device 12 is then pulled outwardly away from the wheel 14 with the rod 38 sliding in the bushes 40 until the chock feet 20 are away from the wheel 14. The device 12 is then rotated about the rod 38 and the pivot joint 36 between the bar 34 and the device 12 is used to keep the device 12 in substantially the same orientation. In this way the chock foot 20 of the left-hand leg 16 can be placed onto the rest 44 and locked thereto using the padlock for example to secure the device 12. The device is thus held in a compact fashion against the side of the trailer 10.

In an alternative arrangement which has been envisaged, the rest 46 may also be provided on the chassis underneath the wall of the trailer 10 so that the feet 20 can be pushed under the side of the trailer wall to sit on the rest with the device being still more close to the trailer wall.

FIGS. 4A and 4B show the second embodiment of the invention which is very similar to the first and the same reference numerals will be used for equivalent features. Only the differences from the first embodiment will be described. In the second embodiment the fixed connection between the bar 34 and the pivot joint 36 is replaced and the bar 24 slidable in a bore in a cylindrical boss 48 provided on the pivot joint 36. The bar 34 is normally held in position by a screw 50 which may be released when the device 12 is to be rotated into the stored position when the bar 34 may be slid through the boss 48 so that the storage position for the device 12 is closer to the wheel 14. In this way less space is required next to the wheel 14 for the device 12.

Clearly, the device need not be stored in the upright position but may be rotated appropriately about the pivot joint to be stored in other orientations. For example, in the type of trailer where the wheel is entirely underneath the trailer carrying surface the device may be stored entirely underneath the trailer carrying surface against the chassis of the trailer. Although left-hand legs and right-hand legs 16,18 have been referred to clearly the device could be produced in mirror image to the devices specifically described and illustrated.

Figure 6:
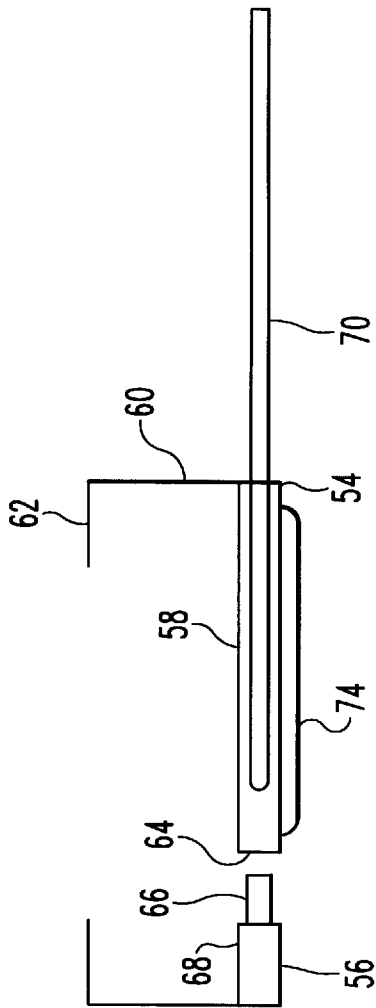

The third embodiment of the invention is shown in FIGS. 5 and 6. The device 50 is shown fitted to the wheel of a caravan 52. The device 50 comprises two U-shaped parts 54,56 which fit together to form a C-shape around a wheel. Thus, the main U-shaped part 54 comprises a main arm 58, a perpendicularly extending transverse arm 60 forming the base of the U-shape and a short arm 62 forming the other side of the U-shape. The end of the main leg 58 terminates in a socket 64 which receives a reduced cross-section part 66 on the end of the main arm 68 of the second U-shaped part 56. The socket 64 and reduced cross-section part 66 include aligned apertures to receive a padlock to lock the U-shaped parts 54,56 together.

The main arm 58 of the main U-shaped part 54 is connected to a round section rod 70. The rod 70 is received in two spaced bushes 72 on the caravan chassis in slidable fashion. The rod 70 is straight over most of its length and is mounted in the bushes 72 horizontally and substantially parallel to the forwards direction of the caravan 52. The rod 70 is curved down at its front end to connect to the main part 54 of the device 50.

The U-shaped parts 54,56 of the device 50 lie in a horizontal plane parallel to the straight portion of the rod 70.

The main arm 58 of the main U-shaped part 54 includes an outwardly extending loop which constitutes a handle 74.

The device 50 includes a chock 76 which is connected to the small U-shaped part 56 by a member 78. The chock 76 is made of square cross-section bar and the member 78 connects to the outer end of the main arm of the small U-shaped part 56.

In use, the device will be retracted to the position shown in phantom where the rod 70 has been slid into the bushes 72 to remove the main U-shaped part 54 from the wheel 53. The user grasps the handle 74 and pulls the main U-shaped part forward until the base arm 60 of the main U-shaped part 54 is in contact with the tyre of the wheel 53. The user then takes the small U-shaped part 56 and inserts the reduced cross-section part 66 in the socket 64 of the main U-shaped part 54 so that the chock 76 is in contact with the ground and the tyre of the wheel 53. The U-shaped parts 54,56 are then locked together by inserting a padlock through the apertures in the socket 64 and reduced cross-section part 66.

A caravan could equally well be provided with the device of the first or second embodiment, but as caravans are generally flat sided, it may be neater to adopt the construction of the third embodiment in which the device stows away without protruding from the flat side surface of the caravan. Equally, the device of the third embodiment could be used on other wheeled vehicles and not simply on caravans.

I claim:

1. An immobilising device on a wheeled vehicle, the immobilising device comprising a wheel clamp connected to the vehicle by a connection, the wheel clamp including two ground engaging pieces which are arranged, in use, alongside the road contact surface of the wheel in spaced positions so as to act as chocks for the wheel to prevent rotation of the wheel and to thereby immobilize the vehicle, the wheel clamp including no more than one removable section.

2. An immobilising device as claimed in claim 1, wherein the immobilising device is retained outside the vehicle when not in use.

3. An immobilising device as claimed in claim 1, wherein the connection is connected to a chassis of the vehicle.

4. An immobilising device as claimed in claim 1, wherein the connection consists of at least one rigid element.

5. An immobilising device as claimed in claim 4, wherein the connection comprises two or three rigid elements.

6. An immobilising device as claimed in claim 4, wherein a plurality of rigid elements is provided and the elements are connected pivotally.

7. An immobilising device as claimed in claim 1, wherein the connection includes a rod which is slidable in relation to the wheel.

8. An immobilising device as claimed in claim 7, wherein the rod is slidable axially in a direction substantially parallel to the wheel axis.

9. An immobilising device as claimed in claim 7, wherein the rod is slidable axially backwards and forwards in relation to the vehicle.

10. An immobilising device as claimed in claim 7, wherein the rod is slidable in at least one bushing.

11. An immobilising device as claimed in claim 10, wherein the rod is slidable in two bushings.

12. An immobilising device as claimed in claim 11, wherein the rod is slidable axially in a direction substantially parallel to the wheel axis, the vehicle having a front and a rear end and a long axis extending from the front end to the rear end so as to perpendicularly bisect the wheel axis, and the two bushings are symmetrically spaced about the long axis of the vehicle.

13. An immobilising device as claimed in claim 1, wherein the connection permits movement of the device in the forwards or backwards direction of the vehicle.

14. An immobilising device as claimed in claim 13, wherein the connection permits rotation of the device.

15. An immobilising device as claimed in claim 14, wherein the rotation is about an axis parallel to the wheel axis.

16. An immobilising device as claimed in claim 14, wherein the connection includes a rod which is rotatable about its own axis.

17. An immobilising device as claimed in claim 16, wherein the rod is rotatable in at least one bushing.

18. An immobilising device as claimed in claim 17, wherein the rod is rotatable in two bushings.

19. An immobilising device as claimed in claim 18, wherein the rod is mounted to lie parallel to the wheel axis, the vehicle having a front end and a rear end and a long axis which extends from the front end to the rear end so as to perpendicularly bisect the wheel axis, and the two bushings are symmetrically spaced about the long axis of the vehicle.

20. An immobilising device as claimed in claim 17, wherein each part of the rod which contacts each bushing is of polygonal transverse cross-section.

21. An immobilising device as claimed in claim 20, wherein the rod is of square transverse cross-section.

22. An immobilising device as claimed in claim 16, wherein the rod is slidable axially in relation to the wheel.

23. An immobilising device as claimed in claim 16, wherein the device and the rod are connected through a slidable connection such that the device can be slide towards the rod.

24. An immobilising device as claimed in claim 1, wherein the connector includes a rod which is slidable in relation to the wheel and the device is mounted to be able to pivot in relation to the rod.

25. An immobilising device as claimed in claim 7, wherein the rod is connected to the device by a bar transverse to the rod.

26. An immobilising device as claimed in claim 25, wherein the bar is connected to the device through a pivot joint.

27. An immobilising device as claimed in claim 1, wherein the device is stored forwards of the wheel when not in use.

28. An immobilising device as claimed in claim 4 wherein a plurality of rigid elements is provided and the elements are connected slidably.

* * * * *

UNITED STATES PATENT AND TRADEMARK OFFICE
CERTIFICATE OF CORRECTION

PATENT NO. : 5,833,034
DATED : February 1, 1999
INVENTOR(S) : Phillip Frederick Banholzer It is certified that error appears in the above-identified patent and that said Letters Patent is hereby corrected as shown below:

In column 1, line 54, please change "water" should read --mater--.

In column 1, line 57, please change "(alkla" should read --(a/k/a--

In column 6, line 28, please change "slide" to --slid--.

Signed and Sealed this

Eighth Day of June, 1999

Attest:

Attesting Officer

Q. TODD DICKINSON

Acting Commissioner of Patents and Trademarks